United States Patent [19]

Logothetis

[11] B 3,925,326

[45] Dec. 9, 1975

[54] ALTERNATING COPOLYMERS OF ETHYLENE/ALKYL ACRYLATES/CURE-SITE MONOMERS AND A PROCESS FOR THEIR PREPARATION

[75] Inventor: Anestis Leonidas Logothetis, Louisville, Ky.

[73] Assignee: E. I. Du Pont de Nemours and Company, Wilmington, Del.

[22] Filed: Mar. 10, 1972

[21] Appl. No.: 233,741

[44] Published under the Trial Voluntary Protest Program on January 28, 1975 as document no. B 233,741.

Related U.S. Application Data

[63] Continuation-in-part of Ser. No. 132,177, April 7, 1971, abandoned.

[52] U.S. Cl..... 260/78.5 R; 260/42.34; 260/45.8 N; 260/47 UA; 260/78.5 T; 260/79.7; 260/80.8; 260/80.73; 260/80.81; 260/836; 260/899
[51] Int. Cl.² ......................................... C08F 15/00
[58] Field of Search............. 260/78.5 R, 79.7, 86.7; 260/80.8, 80.73, 80.81, 47 UA, 47 UP, 78.5 T

[56] References Cited

UNITED STATES PATENTS

| | | | |
|---|---|---|---|
| 3,183,217 | 5/1965 | Serniuk | 260/85.5 |
| 3,413,272 | 11/1968 | Rees | 260/78.5 |
| 3,647,771 | 3/1972 | Nakaguchi | 260/86.7 |
| 3,700,648 | 10/1972 | Hirooka | 260/63 R |

FOREIGN PATENTS OR APPLICATIONS

| | | | |
|---|---|---|---|
| 1,123,723 | 8/1968 | United Kingdom | 260/63 |

*Primary Examiner*—Christopher A. Henderson

[57] ABSTRACT

An amorphous substantially linear atactic alternating copolymer having a glass transition temperature less than about 0°C., and an inherent viscosity of about 1 to about 6, said copolymer having repeating units of —A—B— wherein A is a unit of at least one $C_1$-$C_8$ alkyl acrylate and cure-site monomer if the cure-site monomer is an acrylic, and B is independently selected from ethylene and cure-site monomers if the cure-site monomer is an α-olefin. These copolymers are prepared by reacting monomers in the presence of boron trifluoride and a free radical initiator and, when cured, are particularly useful as elastomers.

14 Claims, No Drawings

ALTERNATING COPOLYMERS OF ETHYLENE/ALKYL ACRYLATES/CURE-SITE MONOMERS AND A PROCESS FOR THEIR PREPARATION

CROSS-REFERENCE TO RELATED APPLICATION

This application is a continuation-in-part of application Ser. No. 132,177, filed Apr. 7, 1971, now abandoned.

BACKGROUND OF THE INVENTION

This invention relates to copolymers of ethylene, alkyl acrylates, a cure-site monomer, and a process for the preparation of the copolymers. More particularly, this invention is concerned with alternating copolymers of ethylene and alkyl acrylates wherein the alkyl contains 1 to about 8 carbon atoms and selected cure-site monomers, and a process for the preparation for these copolymers.

Polymers of ethylene are well known in the art and have found valuable use as elastomers. However, the known elastomeric ethylene polymers have not proved entirely satisfactory because of their low resistance to hydrocarbon oils and oxidation.

Although it is known that polymers consisting essentially of alkyl acrylate monomer units possess good resistance to oils and oxidation, their low temperature properties are unsatisfactory for some applications. Ethylene copolymers containing up to 40 weight % alkyl acrylate units are also known. However, such copolymers generally do not provide substantial improvement in oil resistance over ethylene/α-olefin copolymers.

Thus, there has been a need for an ethylene polymer having improved low temperature properties, resistance to oils and oxidation, and which can be readily cured to form a vulcanizate.

SUMMARY OF THE INVENTION

This invention provides an amorphous substantially linear atactic alternating copolymer having a glass transition temperature less than about 0°C. and an inherent viscosity of about 1–6 (measured on a 0.1 weight % solution in chloroform at 30°C.), said copolymer having repeating units of:

—A—B— wherein A is independently selected from at least one alkyl acrylate, said alkyl having 1–8 carbon atoms and an acrylic cure-site monomer; and B is independently selected from ethylene and an α-olefinic cure-site monomer, said cure-site monomers having the formula
1. $CH_2=CHX$, $CH_2=CX_2$ or $CH_2=CH-CH_2X$, where X is Cl, or F;
2.

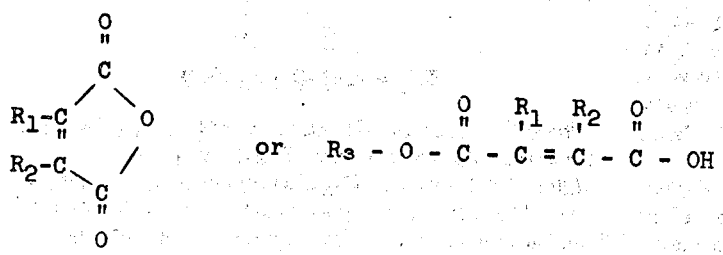

wherein $R_1$ and $R_2$ are independently selected from H, Cl, Br, a $C_1-C_8$ alkyl, phenyl, or naphthyl, $R_3$ is hydrogen, $C_1-C_{10}$ alkyl, phenyl, or naphthyl, substituted phenyl or naphthyl where substituents are alkyl $C_1-C_{10}$, halogen, nitro, and $C_1-C_{10}$ alkoxy groups;

3. 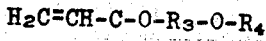

wherein $R_3$ is a $C_1-C_4$ alkylene, and $R_4$ is phenyl, naphthyl, thiophenyl, or $C_1-C_4$ alkyl substituted derivatives thereof;

4. 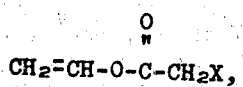

where X is Cl, Br, or F; or

5. 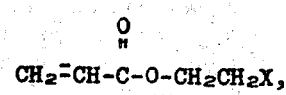

where X is Cl, Br, or F and further, when the cure-site monomer is selected from (1) or (4), mole percent ethylene plus cure-site monomer in the copolymer is about 50, the balance being alkyl acrylate; when the cure-site monomer is selected from (2), (3), or (5), mole % alkyl acrylate plus cure-site monomer in the copolymer is about 50, the balance being ethylene.

This invention also provides a process for preparing an amorphous substantially linear atactic alternating copolymer having a glass transition temperature less than about 0°C. and an inherent viscosity of about 1 to about 6 (measured on a 0.1 weight % solution in chloroform at 30°C.), said copolymer consisting essentially of units derived from at least one alkyl acrylate, said alkyl having 1–8, preferably at least 2, carbon atoms, ethylene units, and about 1–10 mole % based on the copolymer of units derived from a cure-site monomer, the process consisting essentially of reacting in solution in an inert solvent about 1 to about 20 mole % of the alkyl acrylate based on moles of solvent, with ethylene and an effective amount of a cure-site monomer, at a temperature of about −10°C. to about 200°C., preferably 0°C. to about 100°C., in the presence of boron trifluoride at pressures at least sufficient to keep said alkyl acrylate complexed with boron trifluoride and about 0.05 to about 5.0 parts for every 100 parts by weight of alkyl acrylate of a free-radical polymerization initiator, and isolating copolymer formed in the resulting reaction mass.

It has been found that the alternating copolymers of this invention when cured have outstanding resistance to oils. The copolymers of this invention when cured also demonstrate excellent resistance to thermal and oxidative degradation, and are particularly useful as elastomers.

DESCRIPTION OF THE INVENTION

A definition of an elastomer which is applicable to the materials described herein is that of ASTM Special Technical Publication No. 184. An elastomer is "a substance that can be stretched at room temperature to at least twice its original length and, having been stretched and stress removed, returns with force to approximately its original length in a short time." It will be understood that the copolymers are useful as elastomers after the copolymes are cured.

As used herein, the term "consisting essentially of" has its generally accepted meaning as requiring that specified components be present, but not excluding unspecified components which do not materially detract from the basic and novel characteristics of the composition or process as disclosed.

The copolymers of this invention consist essentially of ethylene and units derived from an alkyl acrylate wherein the alkyl is a hydrocarbon group having 1 to 8 carbon atoms, preferably 2–8 carbon atoms. Typical of the alkyl acrylates useful in this invention are methyl acrylate, ethyl acrylate, and butyl acrylate. The preferred alkyl acrylates are ethyl acrylate and butyl acrylate. Mixtures of the alkyl acrylates have also been found to be useful. A particularly preferred mixture consists essentially of ethyl acrylate and butyl acrylate.

The novel copolymers of this invention also contain a cure-site monomer through which cross-linking of polymer chains can occur. The preferred cure-site monomers, and the curing method for polymers containing each type are set forth below. Mixtures of cure-site monomers can also be used.

The first group of cure-site monomers have the formulas $CH_2=CHX$, $CH_2=CX_2$, or $CH_2=CH-CH_2X$, where X is chlorine or fluorine. Preferred monomers are vinyl chloride, vinylidene chloride, and allyl chloride. Copolymers of ethylene, alkyl acrylate, and monomers selected from this first group can be cured with aliphatic diamines, such as hexamethylenediamine carbamate, or aromatic polyhydroxy compounds, such as hydroquinone or bis-phenols.

Other preferred monomers include compounds of the formulae:

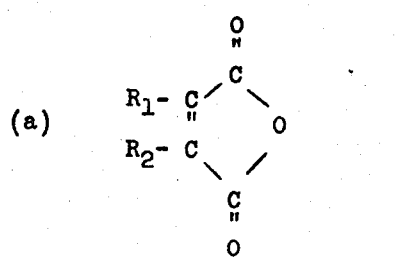

wherein $R_1$ and $R_2$ are independently selected from H, Cl, Br, a $C_1$–$C_8$ alkyl, phenyl, or naphthyl, $R_3$ is a $C_1$–$C_{10}$ alkyl, phenyl, or naphthyl, substituted phenyl or naphthyl wherein substituents are $C_1$–$C_{10}$ alkyl, halogen, nitro, and $C_1$–$C_{10}$ alkoxy groups. Both the cis and trans isomers of the compounds of formula (b) are contemplated. Preferably, $R_1$ and $R_2$ in the above formulae represent hydrogen.

Compounds representative of formula (a) include maleic anhydride and citraconic anhydride. Compounds representative of formula (b) include maleic acid, citraconic acid, fumaric acid, mesaconic acid, and mono-esters of maleic and fumaric acid, including the methyl, ethyl, isopropyl, propyl, butyl, tertbutyl, amyl, isoamyl, hexyl, octyl, decyl, phenyl, 1-naphthyl, 2-naphthyl, 2-methylphenyl, 2-ethylphenyl, 2,5-dimethylphenyl, 4-isopropylphenyl, 4-butylphenyl, 3,5-dimethyl-3-propylphenyl, 3-decylphenyl, 4-n-tetradecylphenyl, 4-n-hexadecylphenyl, 4-n-octadecylphenyl, 2-chlorophenyl, 4-methoxyphenyl, 3-nitrophenyl, 4-bromophenyl, 4-fluoro-2-hexyl, 2-chloro-1-naphthyl, 4-chloro-1-naphthyl, 6-chloro-1-naphthyl, 7,8-dichloro-1-naphthyl, 4-nitro-1-naphthyl, 4-bromo-1-naphthyl, 7-chloro-2-naphthyl, 4-methyl-1-naphthyl, and 1-propyl-2-naphthyl.

Especially preferred cure-site monomers represented by the above formula (b) are the monoalkyl esters of maleic and fumaric acid, such as the ethyl ester. Ethylene/ethyl acrylate terpolymers containing these monoalkylesters have achieved an excellent balance of scorch resistance and cure rate while being cured.

Copolymers containing an anhydride of the above formula (a) can be cured with diamines, calcium hydroxide, or a diepoxide. The diepoxide and diamines are preferred. Copolymers containing as a cure-site monomer an acid of above formula (b) can be cured with metal hydroxides, such as calcium hydroxide or preferably a diepoxide or diamines.

Other cure-site monomers include compounds of the formula:

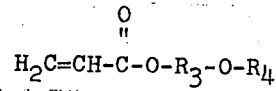

wherein $R_3$ is a $C_1$–$C_4$ alkylene, and $R_4$ is phenyl, naphthyl, thiophenyl or $C_1$–$C_4$ alkyl substituted derivatives thereof. A particularly preferred cure-site monomer is β-phenoxyethyl acrylate. That is, a compound of the above formula where $R_3$ is ethylene and $R_4$ is phenyl. Copolymers containing units derived from these monomers can be cured with formaldehyde catalyzed with an acid generator, such as isopropyltosylate.

Other preferred cure-site monomers are compounds of the formula

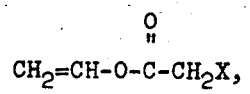

where X is chlorine, fluorine, or bromine. Also compounds of the formula

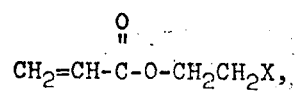

where X is chlorine, fluorine, or bromine. Particularly preferred monomers are vinylchloroacetate and 2-chloroethyl acrylate. Copolymers containing units derived from monomers having either of the above formulas can be cured with aliphatic diamines, such as hexamethylenediamine carbamate.

The novel copolymers of this invention can be cured with the compounds mentioned by the usual techniques. For example, the curing agent and copolymer are mixed on a roll mill or Banbury mixer. The resulting mixture is put in a mold, heated at about 150°C. to about 180°C. for about 10 minutes to about one hour, and at a pressure generally less than about 2,000 psig. The resulting vulcanizate is then cooled and removed from the mold.

A particularly unique aspect of the copolymers of this invention is that the copolymers are alternating copolymers, i.e., there is practically no polymerization among the same types of monomer units. For example, in the copolymers of this invention, there is a practical absence of polyethylene units or polyalkyl acrylate units. There is also a practical absence of interpolymerization among curesite monomer units.

The copolymers of this invention have a glass transition temperature less than about 0°C. This makes the copolymers particularly useful as elastomers. Glass transition temperature for a given copolymer can be determined by methods well known in the art. A typical procedure is described in the Examples. It has been found that the curesite monomer does not appreciably affect the glass transition temperature of substantially linear atactic alternating copolymers of ethylene and alkyl acrylates. For example, in my copending application Ser. No. 132,178, filed Apr. 7, 1971, now abandoned, there is disclosed a novel alternating copolymer of ethylene and ethyl acrylate having a glass transition temperature lower than about −35°C. The introduction of a cure-site monomer into such a copolymer does not appreciably affect the glass transition temperature. The advantage in achieving this result is apparent. Elastomeric materials generally have glass transition temperatures below 0°C. However, introduction of a cure-site monomer would be expected to raise the glass transition temperature of the copolymer, thereby detracting from the elastomeric properties of the copolymer. In fact, however, the curesite monomer does not appreciably affect the glass transition temperature, but nevertheless permits cross-linking of polymer chains.

The copolymers of the present invention consist essentially of practically all linear chains or "backbones." These copolymers exhibit properties substantially the same as known linear copolymers as evidenced by nmr spectra. Also, the copolymers of this invention have been found to be amorphous and possess practically no stereoregularity.

The copolymers of this invention when used to prepare elastomeric products can be processed with conventional rubber processing equipment in the same way as alphaolefin based elastomers, particularly those elastomers having broad molecular weight distribution. Typical of the rubber processing equipment used are roll mills, and internal mixers (such as Banbury mixers). Mixer loading, operating time and speeds, etc. will be obvious to those skilled in the art.

When the copolymers of this invention are blended with rubbers or other polymers, conventional compounding ingredients, such as carbon black, mineral fillers such as clay, coloring agents, extending oils and the like can be incorporated into the elastomeric composition. Preferably, no ingredients should be added which would reduce the resistance to oxidation, oil or thermal degradation.

There is a particular advantage in blending the copolymers of this invention with other polymers. For example, the copolymers of this invention act as plasticizers when blended with polyvinyl chloride (PVC), thereby improving the low temperature properties of PVC.

Heretofore, there was no known process for preparing the alternating copolymers of this invention. Details of a novel process are described below.

The novel process of this invention consists essentially of reacting ethylene and one or more of the alkyl acrylates and cure-site monomers previously mentioned with a Lewis acid and a free-radical polymerization initiator in an inert solvent.

By inert solvent is meant that the solvent does not react with the reactants or with the product formed. The solvent must also be capable of dissolving the reactants and the copolymer formed. Typical of suitable solvents are dichloromethane, chloroform, dichloroethane, benzene, toluene and chlorobenzene. Dichloromethane and dichloroethane are preferred.

A Lewis acid found to be useful in this invention is boron trifluoride. Equal, less than or more than equal amounts relative to the alkyl acrylate can be used. Less than a stoichiometric amount of the Lewis acid with respect to the alkyl acrylate should be avoided because the rate of polymerization decreases. It is preferred to have an equimolar amount.

When the cure-site monomer is α-olefinic, the sum of the moles of ethylene and cure-site monomer used in the polymerization process should be equal to or greater than the moles of the alkyl acrylate. When the cure-site monomer is an acrylic, the sum of the moles of alkyl acrylate and cure-site monomer should be equal to or less than the moles of ethylene. It is preferred to have a molar excess of ethylene. A 2–10 fold excess of ethylene is particularly preferred. The amount of ethylene present during polymerization is dependent on the pressure. The art skilled will recognize that for a given pressure, there is a maximum amount of ethylene which can be present in the polymerization process.

The amount of the alkyl acrylate present during the polymerization reaction is about 1 to about 20 mole percent based on moles of the solvent, preferably about 10 to about 15 mole percent.

An effective amount of the cure-site monomer is present during polymerization. By "an effective amount" is meant an amount which will yield a copolymer having about 1 to about 10 mole percent of cure-site monomer units based on the total number of monomer units in the copolymer. The art skilled will recognize that the amount of cure-site monomer present will vary for each type of monomer, and will depend on the reactivity of the cure-site monomer relative to other monomers present. Knowing the relative reactivities of the monomers, one skilled in the art can determine with a minimum of experimentation the amount of cure-site monomer to be used by reference to the Examples provided hereinafter.

The polymerization reaction is also conducted in the presence of a free-radical polymerization initiator, such as an azo-initiator or an organic peroxide. The most effective free-radical polymerization initiators can be determined by a minimum of experimentation. Preferred initiators are benzoyl peroxide, azobisisobutyronitrile, and 2,2'-azobis(2-methylpropionitrile). The amount of the initiator is about 0.05 to about 5.0 parts for every 100 parts by weight of the alkyl acrylate or mixture of acrylates. The amount of the initiator is preferably about 0.1 to about 1.0 parts by weight. The initiator can be added to the reaction mass at the start of the reaction, or gradually as the reaction progresses. It is conveniently dissolved in the inert solvent before addition to the reactor.

The reaction is conducted at about −10°C. to 200°C., preferably 0°C. to about 100°C., most preferably about 25°C. to about 50°C. The pressure utilized during the reaction is at least sufficient to keep the alkyl acrylate complexed with boron trifluoride. Generally, pressures of from about 10 psig to about 10,000 psig, preferably about 100–1000 psig and, most preferably, 100 to about 500 psig are used. The art skilled will recognize that reaction time is a function of temperature. At higher temperatures, the reaction proceeds at a faster rate. For example, at 25°C. a typical reaction will go to completion in about 60 minutes to about 120 minutes. At about 50°C., the same reaction will take only about 30 to about 60 minutes. Completion of the reaction is evidenced by a drop in reaction pressure as ethylene is consumed during the reaction. The process of this invention can be operated on a batch basis.

The apparatus to be used in practicing the novel process of this invention will be apparent to those skilled in the art and will be selected to withstand the operating temperatures and pressures. It is preferable to mix the reaction mass with agitation in order to obtain a more homogeneous product. For example, mild agitation permits the formation of a copolymer having a more uniform inherent viscosity than a similar copolymer prepared without agitation.

The atmosphere above the liquid reaction mass will be saturated with ethylene vapor. The sequence of addition of the reactants to the reaction vessel is not critical. As a practical matter, in a batch process liquids are generally added first to a reactor, the reactor is then closed, and pressurized in turn with $BF_3$ and ethylene. A continuous process can also be used.

After termination of the reaction, copolymer can be isolated by conventional techniques, e.g. drum drying, or steam stripping. Boron trifluoride is easily removed from the product by drum drying or steam stripping. Another method of isolating the copolymer consists of precipitating the copolymer from the solution using hexane.

The novel process of this invention permits the preparation of copolymers having properties which make them useful as elastomers. Yields of over 95 percent based on the weight of the alkyl acrylate initially in the reaction mass can be obtained by the process of this invention.

This invention is further illustrated by the following specific examples. All parts, proportions, and percentages are by weight unless otherwise indicated.

EXAMPLE 1

A. Preparation of Ethyl Acrylate/Ethylene/Vinyl Chloride Copolymer

A solution of 30 grams (0.3 gram mol) of ethyl acrylate (EA) and 0.15 gram of 2,2′-azobis [2-methyl propionitrile] in 200 milliliters of methylene chloride is saturated with 20.4 grams (0.3 gram-mol) of boron trifluoride and placed in a 400 ml shaker tube. After the tube has been cooled in a bath of crushed solid carbon dioxide and evacuated, it is pressured with 5.0 grams (0.08 gram-mol) of vinyl chloride (VCl) and 50 grams (1.8 gram-mols) of ethylene (E). Copolymerization is then accomplished by shaking the tube at 50°C. for 6 hours. The gases are vented, the product removed from the shaker tube, steam passed through the resulting mixture to remove volatiles, including boron trifluoride and solvent, and the isolated copolymer is dissolved in acetone. The resulting solution is filtered, and the ethyl acrylate/ethylene/vinyl chloride copolymer is precipitated by addition of water, washed twice with methanol in a blender mixer, and dried in a vacuum oven at 80°C. The product obtained is a slightly yellow solid weighing 33 grams. It has an inherent viscosity of 3.10 (measured at 30°C. on a solution of 0.1 gram of tripolymer in 100 milliliters of chloroform) and analyzes for 24.85 wt. % oxygen and 1.8 wt. % chlorine. This analysis indicated the following monomer unit composition:

|  | Wt. % | Mole % |
|---|---|---|
| EA | 77.7 | 50.3 |
| E | 20.1 | 46.4 |
| VCl | 3.2 | 3.3 |

The azo catalyst used above is also called 2,2′-azoisobutyronitrile. The copolymer is an alternating polymer —(A—B)— where "A" is ethyl acrylate and "B" is selected from ethylene and vinyl chloride. Ideally, the product should contain 50.0 mol % EA, the balance being E and VCl. The glass transition temperature is less than about −35°C.

B. Curing of Ethyl Acrylate/Ethylene/Vinyl Chloride Copolymer

The copolymer prepared in Part A is compounded on a rubber roll mill in accordance with the following recipe:

|  | Parts by Weight |
|---|---|
| EA/E/VCl Copolymer | 100 |
| MT carbon black* | 40 |
| MgO | 3.35 |
| Ca(OH)$_2$ | 6.6 |
| Methyltrioctylammonium chloride | 0.33 |
| Hexamethylenediamine carbamate** | 0.33 |

* ASTM type N-990 or N-991
** Diak No. 1 H$_2$N±(CH$_2$)$_6$—NHCO$_2$—

The stock obtained is placed in a 2.54× 12.7-cm. (1 × 5-in.) mold and cured in a press at 160°C. under pressure (30,000 lbs. exerted by the ram) for 30 min. Some of the resulting vulcanizate is tested immediately at room temperature (25°C); the rest is heated at atmospheric pressure in an oven at 150°C. for 24 hrs. and then tested at room temperature. Table I below gives typical data.

TABLE I

| Cured Black Loaded EA/E/VCl Copolymer | | |
|---|---|---|
|  | No Post-cure | Postcured at 150°/24 hrs. |
| Tensile Strength (kg/cm$^2$) | 45 | 141 |
| Modulus at 300% Elongation (kg/cm$^2$) | 31 | 105 |
| Extension at Break (%) | 605 | 400 |
| Permanent Set at Break (%) | 18 | 8 |
| Shore A Hardness | 56 | 58 |

EXAMPLE 2

A. Preparation of Ethyl Acrylate/Ethylene/Vinylidene Chloride (VCl$_2$) Copolymer Substitution of 5.0 grams (0.05 gram-mol) of vinylidene chloride (VCl$_2$) for vinyl chloride in the procedure of Part A of Example 1 typically gives 37.4 grams of a slightly yellow copolymer having an inherent viscosity of 1.71 (measured as before) and a glass transition temperature of −30°C. (by Differential Scanning Calorimetry), and analyzing for 22.95 wt.% oxygen and 6.0 wt.% chlorine. The following monomer unit composition is indicated:

|  | Wt.% | Mole % |
|---|---|---|
| EA | 72.0 | 46.1 |
| E | 19.9 | 45.6 |
| VCl$_2$ | 8.1 | 8.3 |

The analytical methods yield results within ± 3% accuracy.

B. Curing of Ethyl Acrylate/Ethylene/Vinylidene Chloride Copolymer

The copolymer prepared in Part A is compounded on a rubber roll mill in accordance with the following recipe:

|  | Parts by Weight |
|---|---|
| EA/E/VCl$_2$ Copolymer | 100 |
| FEF carbon black* | 50 |
| MgO | 5 |
| Hexamethylenediamine carbamate | 2.67 |

* ASTM Type N-550

Vulcanizates, obtained by curing and postcuring the resulting stock by the procedure of Part B, Example 1, typically display the following properties at room temperature:

TABLE II

| Cured Black Loaded EA/E/VCl$_2$ Copolymer | | |
|---|---|---|
|  | No Postcure | Postcured at 150°/24 hrs. |
| Tensile Strength (kg/cm$^2$) | 59 | 91 |
| Extension at Break (%) | 540 | 200 |
| Permanent Set at Break (%) | 10 | 5 |
| Shore A Hardness | 53 | 58 |

EXAMPLE 3

A. Preparation of Ethyl Acrylate/Ethylene/Maleic Anhydride (MAn) Copolymer

A one-liter autoclave is used. After 450 milliliters of methylene chloride, 50 grams (0.5 gram-mol) of ethyl acrylate, 1.0 gram (0.01 gram-mol) of maleic anhydride, and 0.3 gram of 2,2'-azobis[2-methylpropionitrile] have been introduced therein, the autoclave is evacuated and additionally charged with 34 grams (0.5 gram-mol) of boron trifluoride and 1,200 gram (42.9 gram-mol; 56.2 kg/cm$^2$) of ethylene. The resulting mixture is then agitated for 3 hours at 50°C. Finally, gases are vented and polymer is isolated by the procedure of Part A, Example 1. A typical run gives 48.6 grams of ethyl acrylate/ethylene/maleic anhydride copolymer having an inherent viscosity of 2.70 (measured as described earlier) and containing 1.6 wt. % of maleic anhydride monomer units (based on a neutralization equivalent of 0.32 grammol/kg). The glass transition temperature is less than about −35°C.

B. Curing Ethyl Acrylate/Ethylene/Maleic Anhydride Copolymer

The copolymer prepared in Part A is compounded on a rubber roll mill in accordance with the following recipe:

|  | Parts by Weight |
|---|---|
| EA/E/MAn Copolymer | 100 |
| MT carbon black | 41 |
| MgO | 5.6 |
| Hexamethylenediamine carbamate | 1.13 |

Vulcanizates, obtained by curing and postcuring the resulting stock by the procedure of Part B, Example 1, typically display the following properties at room temperature:

TABLE III

| Cured Black Loaded EA/E/MAn Copolymer | | |
|---|---|---|
|  | No Postcure | Postcured at 150°/24 hrs. |
| Tensile Strength (kg/cm$^2$) | 35 | 88 |
| Extension at Break (%) | 200 | 130 |
| Permanent Set at Break (%) | 0 | 0 |
| Shore A Hardness | 59 | 58 |

EXAMPLE 4

A. Preparation of Ethyl Acrylate/Ethylene/Maleic Acid (MAc) Copolymer

Substitution of 4.0 grams (0.035 gram-mol) of maleic acid for vinyl chloride in the procedure of Part A of Example 1 typically gives 37 grams of polymer having an inherent viscosity of 1.97 (measured as described earlier), a glass transition temperature of −26°C. (DSC), and contains 3.4 wt. % maleic acid monomer units (based on a neutralization equivalent of 0.59 g-mol/kg).

Analysis indicates the following monomer unit composition:

|  | Mole % |
|---|---|
| EA | 46.4 |
| E | 50 |
| MAc | 3.6 |

B. Curing of Ethyl Acrylate/Ethylene/Maleic Acid Copolymer

The copolymer prepared by the procedure of Part A above is compounded on a rubber roll mill in accordance with the following recipe:

|  | Parts by Weight |
|---|---|
| EA/E/MAc Copolymer | 100 |
| FEF carbon black | 50 |
| Liquid Polyepoxide Resin* | 5 |
| N,N-Dimethylphenyl urea | 1 |

*"Epon" 828 Resin (Shell Chemical Co.). See U.S. Patent 2,633,458, "Polyether A."

After this composition is cured in accordance with Part B of Example 1, the vulcanizate obtained typically has the following properties at room temperature:

TABLE IV

| Cured Black Loaded EA/E/MAc Copolymer | |
|---|---|
| Tensile Strength (kg/cm$^2$) | 35 |
| Extension at Break (%) | 100 |
| Permanent Set at Break (%) | 67 |
| Shore A Hardness | 60 |

EXAMPLE 5

A. Preparation of Ethyl Acrylate/Ethylene/β-Phenoxyethyl Acrylate (PEA) Copolymer The general procedure of Part A of Example 1 is repeated except that β-phenoxyethyl acrylate is substituted for vinyl chloride and the concentrations of the other reactants are lowered as follows:

| Reactant | Grams | Gram-Moles |
|---|---|---|
| Ethyl acrylate | 20 | 0.2 |
| Ethylene | 40 | 1.4 |
| β-phenoxyethyl acrylate | 5.0 | 0.02 |
| $BF_3$ | 13.6 | 0.2 |

In a typical run 29.8 grams of slightly gelled polymer are isolated. The glass transition temperature is less than about −35°C.

Analysis indicates the following monomer unit composition:

| | |
|---|---|
| EA | 46 |
| E | 50 |
| PEA | 4 |

B. Curing Ethyl Acrylate/Ethylene/β-Phenoxyethyl Acrylate Copolymer

The copolymer prepared in Part A above is compounded on a rubber roll mill in accordance with the following recipe:

| | Parts by Weight |
|---|---|
| EA/E/PEA Copolymer | 100 |
| FEF carbon black | 50 |
| Paraformaldehyde | 3 |
| isoPropyl tosylate | 3 |

Paraformaldehyde, obtained by evaporating an aqueous solution of formaldehyde, has the structure $HOCH_2(OCH_2)_nOCH_2OH$. It is an amorphous solid of high molecular weight that is insoluble in water. Depolymerization occurs at 180°–200°; hence paraformaldehyde is a convenient source of anhydrous, gaseous formaldehyde.

Curing of the above composition in accordance with Part B of Example 1 gives vulcanizates typically having the following properties at room temperature:

TABLE VI

| Cured Black Loaded EA/E/PEA Copolymer | |
|---|---|
| Tensile Strength (kg/cm²) | 134 |
| Extension at Break (%) | 150 |
| Permanent Set at Break (%) | 2 |
| Shore A Hardness | 64 |

EXAMPLE 6

A. Preparation of Ethyl Acrylate/Ethylene/2-Chloroethyl Acrylate (ClEA) Copolymer The general procedure of Part A of Example 1 is repeated except that 4.0 grams (0.03 gram-mol) of 2-chloroethylacrylate is substituted for vinyl chloride, the temperature is kept at 25°C., and the reaction time is lengthened to 12 hours. A 40-gram yield of copolymer is typically obtained having an inherent viscosity of 3.26 and analyzing for 2.2 wt. % Cl (corresponding to 8.3 wt. % 2-chloroethyl acrylate monomer unit content). The glass transition temperature is less than about −35°C.

B. Curing Ethyl Acrylate/Ethylene/2-Chloroethyl Acrylate Copolymer

The copolymer prepared in Part A above is compounded on a rubber roll mill to give the following composition:

| | Parts by Weight |
|---|---|
| EA/E/ClEA Copolymer | 100 |
| FEF carbon black | 50 |
| Antioxidant* | 1 |
| Stearic acid | 1 |
| Lead phosphite | 5 |
| Hexamethylenediamine carbamate | 0.8 |

* "AgeRite" Resin D (polymerized 2,2,4-trimethyl-1,2-dihydroquinoline)

Curing of this composition in accordance with Part B of Example 1 gives vulcanizates typically having the following properties at 25°C.

TABLE VII

| Cured Black Loaded EA/E/ClEA Copolymer | |
|---|---|
| Tensile Strength at Break (kg/cm²) | 169 |
| Extension at Break (%) | 350 |
| Compression Set [22 hrs./70°C.; Method B], (%) | 31 |

EXAMPLE 7

A. Preparation of Ethyl Acrylate/Ethylene/Vinyl Chloroacetate Copolymer

A solution of 20 g. ethylacrylate 2.0 g. of vinyl chloroacetate, 0.0165 gram-mole and 0.15 g. 2,2′-azobis(2-methylpropionitrile) in 200 ml dichloromethane is saturated with $BF_3$ and placed in a 400 ml shaker tube. The general procedure of Example 1, Part A is followed except that the temperature is kept at 25°C. for 6 hours. There is obtained 24.3 g. of copolymer having an inherent viscosity of 1.77 (measured as above) and containing 0.5% Cl (1.7 wt. % vinyl chloroacetate).

B. Curing of Ethyl Acrylate/Ethylene/Vinyl Chloroacetate Copolymer

The copolymer prepared by the procedure above (Part A) is compounded in a rubber mill as follows:

| | Parts by Weight |
|---|---|
| EA/E/VClA | 100 |
| FEF Carbon Black | 50 |
| Agerite D | 1.0 |
| Stearic Acid | 4.0 |
| Lead Phosphite | 5.0 |
| Hexamethylenediamine carbamate | 1.0 |

After this composition is cured in accordance with Part B of Example 1 followed by a 24 hour heat aging at 150°C., it gives the following vulcanizable results at 25°C.

TABLE VIII

| Cured Black Loaded EA/E/VClA Copolymer | |
|---|---|
| Tensile Strength at Break (kg/cm²) | 164 |
| Extension at Break (%) | 255 |
| Compression Set (%) [70 hr/100°C., Method B] | 28 |
| Permanent Set at Break (%) | 3 |
| Shore A Hardness | 61 |

EXAMPLE 8

E/Ethyl Acrylate/Maleic Acid Mono Ethyl Ester Terpolymer

A. Preparation

Ethyl acrylate (323 grams; 350 milliliters), maleic acid mono ethyl ester (4.5 grams), and methylene chloride ($CH_2Cl_2$; 3,000 milliliters) are added to a one-gallon reactor which is subsequently evacuated (200 mm Hg) for 2 minutes. Boron trifluoride is added until the reactor pressure is stabilized at 10 psig; during this operation cold water is passed through the reactor cooling jacket to compensate for the heat evolution occurring. The moles of boron trifluoride introduced are about equal to the sum of the moles of ethyl acrylate and maleic acid mono ethyl ester.

The reactor is then successively evacuated for two minutes and pressured to 50 psig with nitrogen. This operation is repeated (to insure the removal of most of the oxygen from the system).

Ethylene is pressured to 300 psig, the reactor temperature is adjusted to 40°C., and a solution of benzoyl peroxide (one gram) in 50 milliliters of methylene chloride is injected. Copolymerization starts within a few minutes and lasts for 2.5 hours.

Live steam is then passed through the resulting copolymer solution in a separate vessel to remove volatiles. The copolymer crumbs thus isolated are washed in a blender with an acetone-water mixture (50:50) and dried in a vacuum oven to give 341 grams of ethylene/ethyl acrylate/maleic acid mono ethyl ester terpolymer (80% conversion of acrylate). This product has an inherent viscosity of 3.26, a Wallace Plasticity of 40, and a glass transition temperature of −29°C. An analysis indicates that the oxygen content is 25.72 wt. % and the maleic acid mono ethyl ester content is 1.08 wt. %. The ethylene units alternate with units of ethyl acrylate (or maleic acid mono ethyl ester) in the form $-(C_1-C_2)_n-$ where $C_1$ represents an ethylene unit and $C_2$ represents a unit selected from ethyl acrylate and maleic acid mono ethyl ester; $n$ is an integer.

B. Cure

The terpolymer made by the procedure of Part A is compounded on a rubber roll mill by the recipe given below and cured at 180°C. for 30 minutes, and aged at 150°C. for 24 hours in an air oven:

| | Parts by Weight |
|---|---|
| Terpolymer | 100 |
| FEF carbon black[a] | 50 |
| Antioxidant[b] | 1 |
| Hexamethylenediamine Carbamate | 0.75 |

[a] ASTM class N-550
[b] Polymerized 2,2,4-trimethyl-1,2-dihydroquinoline

The vulcanizate displays the following properties:

| Stress-Strain at 25°C. | |
|---|---|
| Modulus at 100% Extension (kg/cm$^2$) | 51.0 |
| Tensile Strength at Break (kg/cm$^2$) | 210.0 |
| Extension at Break (%) | 270 |
| Permanent Set at Break (%) | 3.5 |
| Shore A Hardness | 61 |
| Compression Set, 70 hr./150°C. (%) | 20 |
| Clash-Berg Temperature | −31°C. |
| Brittle Point | −57°C. |
| % Volume Swell 100°C./7 days: | |
| In water | 3.5 |
| In No. 3 ASTM Oil | 32.5 |

EXAMPLE 9

E/Ethyl Acrylate/Fumaric Acid Mono Ethyl Ester Terpolymer

A. Preparation

The process of Part A of Example 8 is repeated except that maleic acid mono ethyl ester is replaced by fumaric acid mono ethyl ester (3.75 grams). 407 grams of ethylene/ethyl acrylate/fumaric acid mono ethyl ester terpolymer (98% conversion of ethyl acrylate) is obtained. This product has an inherent viscosity of 2.81, a Wallace Plasticity of 27, and a glass transition of −31°C. Analysis indicates that the oxygen content is 25.73 wt. % and the fumaric acid mono ethyl ester content is 0.9 wt. %. The ethylene units alternate with units of ethyl acrylate (or fumaric acid mono ethyl ester) in the form $-(C_1-C_2)_n-$ where $C_1$ represents an ethylene unit and $C_2$ represents a unit selected from ethyl acrylate and fumaric acid mono ethyl ester; $n$ is an integer.

B. Cure

The terpolymer made by the procedure of Part A above is compounded, cured, and heat aged by the same procedure used in Example 8, Part B. The vulcanizate properties are:

| Stress-Strain at 25°C. | |
|---|---|
| Modulus at 100% Extension (kg/cm$^2$) | 31.6 |
| Tensile Strength at Break (kg/cm$^2$) | 161.7 |
| Extension at Break (%) | 300 |
| Permanent Set at Break (%) | 5 |
| Compression Set, 70 hr. 150°C. (%) | 28 |
| Class-Berg Temperature | −31°C. |
| Brittle Point | −49°C. |

A differential scanning calorimeter (prototype of the commercial Du Pont instrument) is used to measure glass transition temperature. It is a miniature oven containing 2 thermocouples. A tiny aluminum cup (0.25-inch in diameter) is seated on each of these thermocouples. The reference cup is empty, air or nitrogen being the medium. The sample cup contains a minute polymer sample (e.g. 15 mg). Since both sample and reference are at the same temperature when the test starts, the thermocouples generate no signal, i.e., $\Delta T = O$. The starting temperature should be below the second order transition temperature, preferably 0°C. or below. During the measurement, the cups are heated, the temperature in the oven rising at the rate of 11°C./min. At the transition point, however, heat will be absorbed to effect the change of state from glassy to rubbery polymer; since the polymer temperature will be steady, $\Delta T$ will suddenly rise as the reference medium becomes warmer than the polymer. When all the glass has become rubber, the polymer will begin to warm up again, and $\Delta T$ will fall off toward zero.

For reliable comparisons of polymer samples, each should have had the same history before testing and the test details should be the same (e.g., rate of heating, sample size, etc.).

Typical useful art is the book *Thermoanalytical Methods of Investigation* by P. D. Garn, Academic Press, N.Y. 1965.

I claim:

1. An amorphous substantially linear atactic alternating copolymer having a glass transition temperature less than about 0°C. and an inherent viscosity of about 1–6 (measured on a 0.1 wt. % solution in chloroform at 30°C.), said copolymer having repeating units consisting essentially of of:

$$-A-B-$$

wherein A is independently selected from at least one alkyl acrylate, said alkyl group having from 1–8 carbon atoms and an acrylic cure-site monomer, and B is ethylene, said cure-site monomers having the formulae:

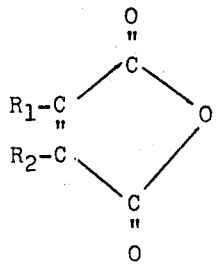 or 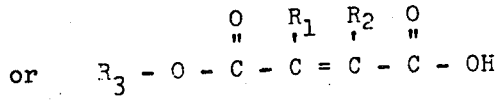

wherein $R_1$ and $R_2$ are independently selected from H, Cl, Br, a $C_1$–$C_8$ alkyl, phenyl, or naphthyl, and $R_3$ is hydrogen, $C_1$–$C_{10}$ alkyl, phenyl or naphthyl, substituted phenyl or naphthyl where substituents are alkyl $C_1$–$C_{10}$, halogen, nitro, and $C_1$–$C_{10}$ alkoxy groups,
the mole percent alkyl acrylate plus cure-site monomer in the copolymer is about 50, the balance being ethylene.

2. The copolymer of claim 1 wherein the cure-site monomer has the formula

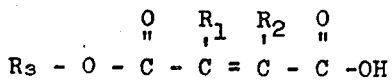

wherein $R_1$ and $R_2$ are independently selected from H, Cl, Br, a $C_1$–$C_8$ alkyl, phenyl, or naphthyl, and $R_3$ is a $C_1$–$C_{10}$ alkyl, phenyl, or naphthyl, substituted phenyl or naphthyl wherein substituents are alkyl $C_1$–$C_{10}$ halogen, nitro, and $C_1$–$C_{10}$ alkoxy groups.

3. The copolymer of claim 2 wherein $R_1$ and $R_2$ are hydrogen.

4. The copolymer of claim 3 wherein the alkyl group of the alkyl acrylate contains 2–8 carbon atoms.

5. The polymer of claim 1 wherein the alkyl acrylate is ethyl acrylate.

6. The copolymer of claim 5 wherein the cure-site monomer is maleic anhydride or maleic acid.

7. The copolymer of claim 1 wherein the curesite monomer is monoethylmaleate.

8. The copolymer of claim 1 wherein the curesite monomer is the monoethyl ester of fumaric acid.

9. The copolymer of claim 1 wherein the alkyl acrylate is butyl acrylate.

10. The copolymer of claim 9 wherein the cure-site monomer is maleic anhydride or maleic acid.

11. The copolymer of claim 4 wherein the cure-site monomer is monoethylmaleate.

12. The copolymer of claim 11 wherein the alkyl acrylate is ethyl acrylate.

13. The copolymer of claim 4 wherein the cure-site monomer is the monoethyl ester of fumaric acid.

14. The copolymer of claim 13 wherein the alkyl acrylate is ethyl acrylate.

* * * * *